United States Patent [19]
Anthony et al.

[11] 3,992,259
[45] Nov. 16, 1976

[54] FUEL ASSEMBLY FOR A NUCLEAR REACTOR

[75] Inventors: Andrew James Anthony, Tariffville; John Jefferson Hutchinson, Windsor, both of Conn.

[73] Assignee: Combustion Engineering, Inc., Windsor, Conn.

[22] Filed: June 25, 1973

[21] Appl. No.: 373,207

[52] U.S. Cl. ............................. 176/78; 151/2 A; 285/92
[51] Int. Cl.² ........................................... G21C 3/32
[58] Field of Search ............... 151/2 A, 9; 285/92; 176/66, 67, 73, 75, 76, 78, 79

[56] References Cited
UNITED STATES PATENTS

| | | | |
|---|---|---|---|
| 1,206,410 | 11/1916 | Butler | 151/9 |
| 3,389,056 | 6/1968 | Frisch | 176/78 |
| 3,814,667 | 6/1974 | Klumb et al. | 176/78 |
| 3,828,868 | 8/1974 | Jabsen | 176/76 |
| 3,853,703 | 12/1974 | Anthony et al. | 176/87 |

OTHER PUBLICATIONS

Sears and Zemansky, University Physics, 1949, 15-5 Linear expansion, pp. 261–263.

Primary Examiner—Stephen C. Bentley

[57] ABSTRACT

A nuclear reactor fuel assembly having an easily dissassembled threaded connection between the end fitting and the control rod guide tubes. More specifically, the threaded connection is formed between the upper and/or lower alignment posts and the guide tubes and clamps the fuel assembly end plate therebetween. The sizing and arrangement of the connections is such that the assembled joint may be subjected to thermal cycling without incurring excessive stresses or deformations.

8 Claims, 6 Drawing Figures

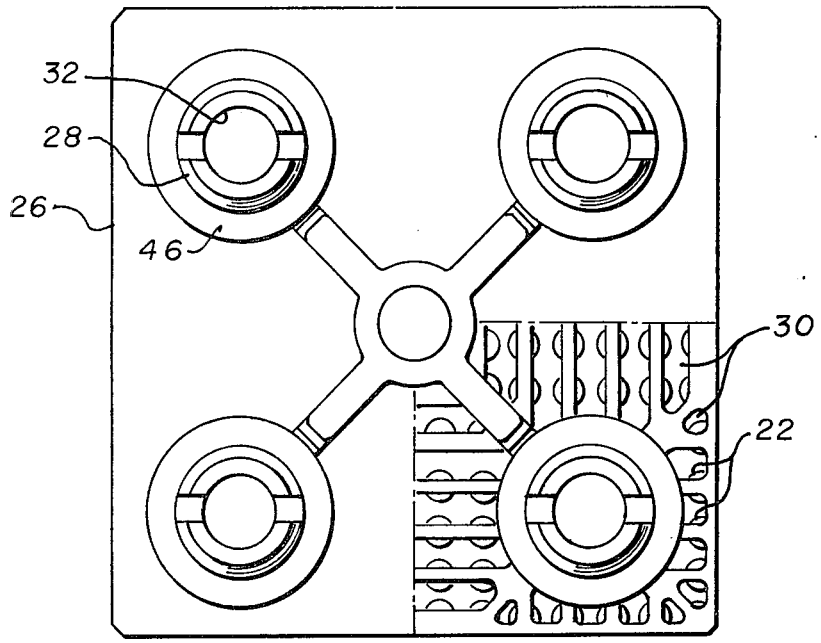
FIG. 4
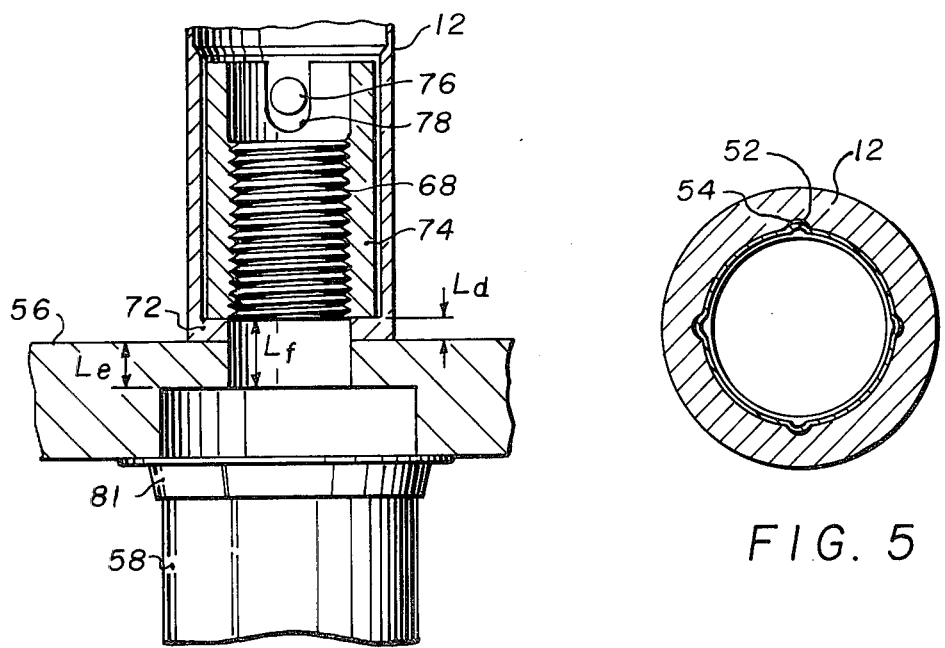
FIG. 6
FIG. 5

FUEL ASSEMBLY FOR A NUCLEAR REACTOR

BACKGROUND OF THE INVENTION

1. Field of the Invention

The present invention relates to fuel assemblies for nuclear reactors and more particularly to such assemblies which may be easily disassembled to permit removal and insertion of fuel or poison rods within the assembly.

2. Description of the Prior Art

It is well known that the fuel or fissionable material for heterogeneous nuclear reactors is conventionally contained in a number of thin walled tubes forming elongated fuel rods which may be grouped and joined together into fuel element assemblies. Each reactor has a number of such fuel assemblies therein comprising the reactor core.

It is also known that it is desirable from the standpoint of cost and reactor efficiency, to have fuel assemblies in which defective fuel rods may be replaced or special fuel or burnable poison rods added after the assembly has been irradiated. Such versatility may preclude an entire assembly from being prematurely scraped because of a relatively few defective fuel rods.

Various prior art fuel assemblies have been designed to have such a capacity. Typical of such designs is the one disclosed in U.S. Pat. No. 3,255,091, entitled "Fuel Arrangement for a Nuclear Reactor" of E. Frisch. The Frisch patent discloses a fuel assembly generally referred to as the "canned" type wherein structural support is provided by a peripherally extending elongated frame or can. The assembly includes removable retaining plates, which, when removed, permit access to and removal of individual fuel rods. End plates arranged at opposite ends of the frame remain permanently attached and contain openings, aligned with the fuel rods, through which the rods may be withdrawn.

Another prior art patent which discloses a fuel assembly design which may be disassembled to provide access to the fuel rods in U.S. Pat. No. 3431170 "Nuclear Reactor Fuel Bundle" of J. L. Lass et al. The Lass patent also employs an outer can structure and has a removable upper tie plate, which, when removed, facilitates easy withdrawal or insertion of fuel rods.

Recently, nuclear reactor fuel assemblies have been made wherein structural support is provided by vertically extending hollow tubes which serve as guides for control rod elements and which are secured to upper and lower end plates. The fuel rods are aligned and supported within the structural framework formed by the guide tubes and end plates by spacer grids which are welded to the guide tubes and provide both lateral and, to some extent, axial restraint to the fuel rods. Generally, the end plates and the guide tubes have been made from the same material such as, for example, stainless steel and the connections between these elements have been made by welding the parts together.

More recently, however, some components of such fuel assemblies have been fabricated from the zirconium alloy Zircaloy. The advantages of Zircaloy for this application include its low neutron absorption cross section and its high corrosion resistance to water at the customary operating temperatures of pressurized water reactors. Disadvantages of Zircaloy include its high cost, primarily due to the extreme difficulty in working the material, and the fact that welding of this material must be performed in an inert atmosphere. Also Zircaloy components have relatively poor wear resistance when subjected to relative motions or rubbing against an adjacent component.

As a result it has been found that from both the standpoint of neutron economy and dollar economy, a fuel element assembly fabricated using Zircaloy for the elements within the core active region, and a material such as stainless steel or the nickel, chromium, iron alloy having the trade name Inconel for the remainder of the elements, is a most attractive design. Those elements considered to be in the active region include the vertically extending control rod guide tubes, the fuel rod spacer grids and the cladding of the fuel rods themselves. Elements outside the active region include the upper and lower end plates and the means associated with the end plates for supporting and maintaining the alignment of the fuel assembly within the reactor core.

Because of the dissimilarity of the metals in such a design, welding cannot be used to attach the guide tubes to the end plates and a suitable mechanical joint is required. An arrangement for forming such a connection is shown in FIG. 4 of copending application Ser. No. 145,374, Fuel Assembly Holddown Device of R. H. Klumb et al. filed on May 20, 1971 and assigned to the same assignee as the present application. While such an arrangement provides a suitable connection, it is not possible to easily disassemble this connection in order to gain access to the fuel rods. Such disassembly becomes virtually impossible, following irradiation of the fuel assembly and the axial thermal growth of the fuel rods which occurs as a result thereof. As a result of the thermal growth, there is very little clearance between the upper ends of the rods and the bottom of the upper end plate and access to and disassembly of the joint is not possible.

BRIEF SUMMARY OF THE INVENTION

The present invention relates to a nuclear reactor fuel assembly in which the end fittings may be easily removed after the assembly has been irradiated so that defective fuel rods may be replaced or special fuel or burnable poison rods inserted therein. The fuel assembly is of the type wherein structural support is provided by several vertically extending hollow structural members attached at opposite ends to upper and lower end fittings. The upper and lower end fittings each comprise an end plate and means extending therefrom for alignment and support of the assembly within the reactor core. Threaded joints between the hollow structural members and the means for alignment form the connections between the hollow structural members and the upper and lower end fittings.

In a preferred embodiment, the hollow structural members are made from a first structural material such as for example Zircaloy, and the end fitting plates and the means for alignment are made from a second material such as stainless steel. The coefficient of thermal expansion of stainless steel is greater than that of Zircaloy and the configuration and relative dimensions of the components are such as to balance the thermal expansion of the components so as not to overload the threaded joint in either the axial or radial direction. As a result the joint is capable of experiencing temperature variations and still maintain its structual integrity.

BRIEF DESCRIPTION OF THE DRAWINGS

FIG. 4 is a top end view of the fuel assembly of FIG. 1;

FIG. 5 is a sectional view taken along the line 5—5 of FIG. 2;

FIG. 6 is an enlarged side view of the lower end fitting connection of the fuel assembly of FIG. 1.

DESCRIPTION OF THE PREFERRED EMBODIMENT

General Arrangement of Fuel Assembly

Figure 1:
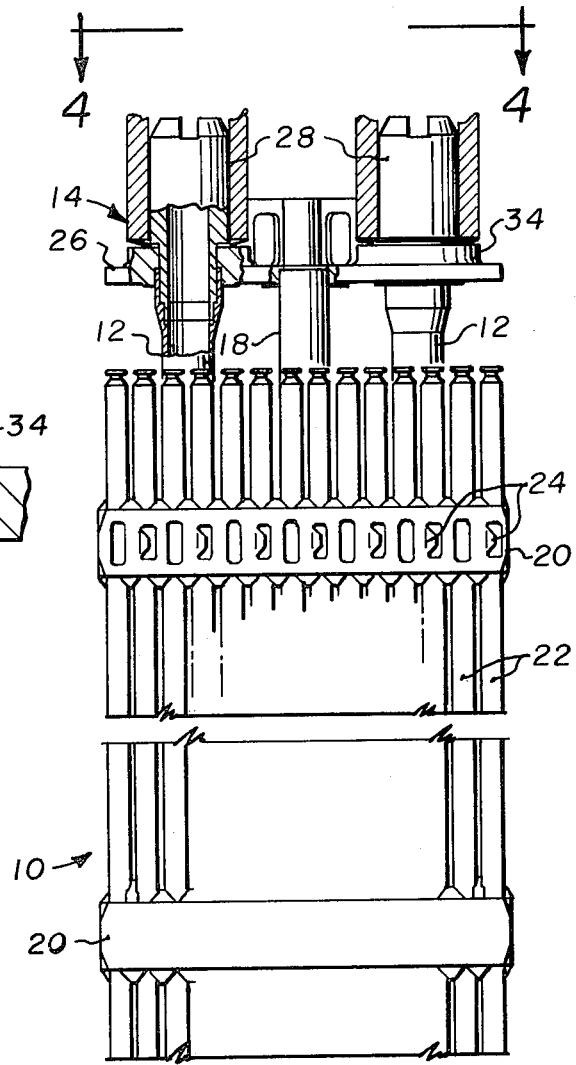
FIG. 1 is a fragmentary side view of a fuel assembly employing the present invention.

Referring to FIGS. 1 and 4 there is shown a nuclear reactor fuel element assembly 10 which is comprised of four vertically extending parallel Zircaloy guide tubes 12 coextensive with one another and which are removably attached to upper and lower end fittings 14 and 16, respectively in a manner according to the present invention. A fifth Zircaloy guide tube 18 which is centrally located in the fuel assembly is merely supported by the upper and lower end fittings, 14, 16 and is not structuraly attached thereto. The guide tubes 12 and the end fittings 14 and 16 provide the structural framework for the fuel assembly. A plurality of rectangular Zircaloy spacer grids 20 are positioned at various elevations along the guide tubes 12, 18 and are suitably welded thereto. A plurality of elongated, thin walled fuel rods 22 are supported in a parallel, vertical arrangement within a fuel assembly 10 by the several spacer grids 20. The spacer grids 20 are of conventional design and include respective openings through which the fuel rods 22 extend. The grids 20 are provided with resilient means 24 projecting into the openings for supporting the fuel rods against lateral displacement and also frictionally against longitudinal movement.

Upper End Fitting & Attachment thereof to Guide Tubes

Figure 2:
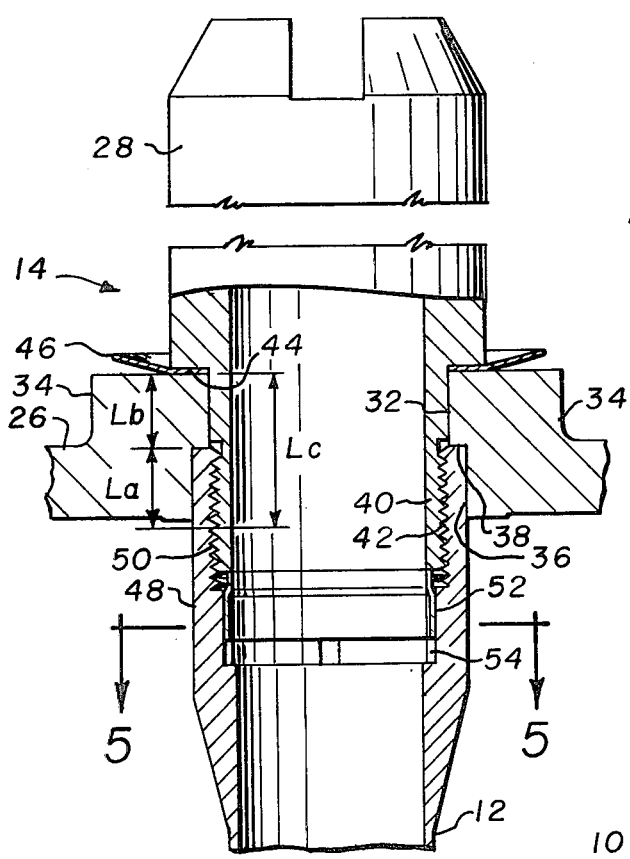
FIG. 2 is an enlarged view of the upper end fitting connection of the fuel assembly of FIG. 1.

Referring now to FIG. 2, the means for attaching the upper end fitting 14 to the four outer guide tubes 12 is shown in detail. The upper end fitting 14 comprises an upper end plate 26 and four upstanding alignment posts 28 which are adapted to slidably engage corresponding openings in the reactor core alignment plate (not shown) when the assembly is installed in a reactor, thereby providing lateral support to maintain the assembly in a vertical position. The upper end plate 26, in the preferred construction, contains therein a plurality of various size and shaped openings 30 to permit the free flow of coolant therethrough when installed in a reactor. The arrangement of these openings is clearly shown in FIG. 4.

Referring now to FIGS. 2 and 4, additional circular openings 32 are provided in the end plate 26 in axial alignment with the four guide tubes 12. Each of the openings 32 extends through a raised boss 34 formed in the end plate 26 and includes (FIG. 2) a small diameter bore identified by the number 32 and a larger diameter section 36. A downwardly facing annular shoulder 38 is formed at the transition between the two bore sections.

The alignment posts 28 each include a spindle 40 of reduced diameter projecting downwardly therefrom. The spindle is sized to pass through the first bore 32 of the opening in the end plate 26, and is provided with external threads 42 on the lower portion thereof. The transition between the upper end of the alignment posts 28 and the spindle 40 forms a second downwardly facing shoulder 44 which engages the upper surface of the boss 34 to limit the penetration of the spindle.

The upper end 48 of each of the guide tubes 12 is enlarged to a diameter which is sized to form a close fit with the second bore section 36 of the openings in the upper plate 26 and is provided with internal threads 50. These threads are sized to mate with those provided on the spindle 40 so that when the members are assembled the enlarged upper ends 48 of the guide tubes 12 are caused to bear against the first shoulder 38, and the second shoulder 44 of the upper alignment post, engages the boss 34 to form a rigid mechanical connection between the three components. As an added safety feature to prevent rotation of the various parts during operation, the spindles 40 are provided with several axial extensions 52 which are deformable into engagement with receiving indentations 54 formed within the enlarged portions of the guide tubes. This arrangement is best seen by reference to FIGS. 2 and 5. The extensions 52 are engaged by use of a suitable tool inserted downwardly through the center openings of the alignment posts 28. When it is desired to disassemble the upper end fitting a suitable remote handling tool is engaged with the alignment post 28 and sufficient torque is applied thereto to overcome the torque of the threaded connection and to forcibly disengage the deformable extension from the indentation 54.

In the above-described joint, the guide tubes 12, upper end plate 26 and alignment posts 28 are made from dissimilar materials having differing coefficients of thermal expansion. More specifically, in a preferred embodiment, the guide tubes 12 are made from Zircaloy, the upper end plate 26 from stainless steel and the alignment posts 28 from the nickel, chromium, iron alloy having the trade name Inconel.

In accordance with the principles of the invention, the physical configuration of the joint, including the arrangement of components and the relative dimension of the components are such that the joint will maintain its structural integrity when it is subjected to thermal cycling.

This relationship will be described with reference to FIG. 2, where the symbols used in this figure are defined as follows:

| | |
|---|---|
| $L_a$ | = the distance from the end of the threaded portion of the structural member to a point along the member such that substantially all of the load bearing threads are included therein; |
| $L_b$ | = the portion of the thickness of the end fitting plate which contains the first bore section; |
| $L_c$ | = the distance from the second shoulder on the means for alignment to the point on the threaded spindle corresponding to the point on the structural member described in the definition of $L_a$. |
| $\alpha ZIRC$ | = the coefficient of thermal expansion of Zircaloy = $3.4 \times 10^{-6}$ |

-continued

| | |
|---|---|
| αINC | = the coefficient of thermal expansion of Inconel = 7.8 × 10⁻⁶ |
| αSS | = the coefficient of thermal expansion of stainless steel = 9.7 × 10⁻⁶ |

A preferred relationship between these terms is expressed as follows:

$$L_a \alpha ZIRC + L_b \alpha SS = L_c \alpha INC \quad (1)$$

When designed substantially in accordance with the foregoing relationship, the assembled joint may be subjected to thermal cycling without incurring excessive stresses or deformations which would affect the strength and replacement requirements, respectively, of the joint components. It should be noted that the $L_a$ and $L_c$ dimensions are defined to include that part of the threaded connection which bears substantially all of the load when the joint is assembled. This choice is dictated by the well-known fact that in a threaded connection the majority of the load is taken up by the first few threads of the joint, and by the desire to minimize stresses in these threads, in particular, during thermal cycling.

Generalizing formula (1) set forth above it becomes:

$$L_a \alpha_1 + L_b \alpha_3 = L_c \alpha_2$$

where $\alpha_1$, $\alpha_2$, and $\alpha_3$ are the coefficients of thermal expansion of any three dissimilar metals and are related according to the following $\alpha_1 < \alpha_2 < \alpha_3$.

LOWER END FITTING & ATTACHMENT THEREOF TO GUIDE TUBES

Figure 3:
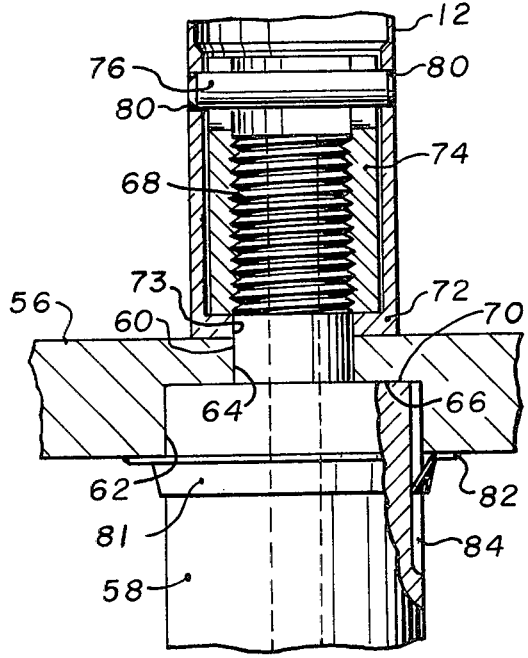
FIG. 3 is an enlarged view of the lower end fitting connection of the fuel assembly of FIG. 1.

Referring now to FIGS. 3 and 6, another embodiment of the invention is shown. This embodiment is shown as the attachment of the lower end fitting 16 to the structural guide tubes 12. The lower end fitting is made up from a lower end plate 56 and four alignment pins 58 which are adapted to slidably engage corresponding openings in the lower core support plate (not shown), when the assembly is installed in a reactor. As with the upper end plate 26, the lower end plate 56 contains a plurality of various sized and shaped openings (not shown) to permit the free flow of coolant fluid therethrough. Likewise, additional circular openings 60 are provided in the plate in axial alignment with the four guide tubes 12.

Referring now to the detail shown in FIG. 3, each of the circular openings 60 includes a large diameter bore 62 and a smaller bore section 64. A downwardly facing annular shoulder 66 is formed at the transition between the two bore sections.

The alignment pins 58 each include an externally threaded portion of reduced diameter 68 extending upwardly therefrom. This reduced diameter portion is sized to be received in the smaller bore section 64 of the lower end plate 66. The main body of the alignment pin 58 is such that it fits within the larger bore section 62 and an upwardly facing shoulder 70 is thus formed on the pin which is adapted to mate with the shoulder 66 in the end plate and thereby limit the penetration of the reduced diameter portion 58.

Each of the four structural guide tubes 12 are provided with an inwardly extending annular flange 72 at the lower end thereof which defines an opening 73 of a diameter to allow passage of the threaded end 68 of the alignment pin 58. Disposed within the lower end of the guide tube 12 is a cylindrical nut 74 having internal threads to engage those on the alignment pins. This nut rests upon the upper surface of the inwardly extending flange in the end of the guide tubes and is restrained from rotating and to some extent axially moving by a pin 76 which extends through a U-shaped slot 78 (see FIG. 6) in the nut and into oppositely disposed openings in the sides of the guide tubes 12. The thickness of the wall of the guide tube is increased at the lower end thereof to ensure a rigid connection.

The assembly of the guide tube/nut assembly is accomplished in the following manner. The nut 74 is dropped into the guide tube 12 through the upper end and allowed to come to rest upon the flange 72. The pin 76 is then inserted through the guide tube wall into position, welded in place on each end, and the weld 80 ground flush with the guide tube outer surface.

The lower end fitting joint is then assembled by first aligning the opening 73 in the lower end of the guide tubes with the corresponding opening in the lower end plate. The threaded portion 68 of the alignment pin 58 is then inserted through the opening and threadably engaged with the nut 74 and tightened to the desired torque level. A deformable locking collar 81 is then slipped over the pin 58, welded to the bottom of the lower end plate, as at 82, and crimped to engage the several longitudinal slots 84 provided in the alignment pins 58. As with the upper end fitting, when it is desired to disassemble this joint, a suitable tool is engaged with the alignment pin and sufficient torque is applied thereto to overcome the torque of the threaded connection and to disengage the locking collar.

As with the upper joint, dissimilar metals having different coefficient of linear expansion are used in the lower end fitting joint. In a preferred design, guide tubes 12 are zircaloy, the lower end fitting plate 56 is stainless steel and the alignment pin 58 is made from the nickel-chromium-iron alloy Inconel. The nut 74 is made from Inconel while the pin 76 which must be welded to the guide tubes 12 is fabricated from zircaloy.

Again, as with the first embodiment, this joint is configured so that it will maintain its strutural integrity under thermal cycling. The relationship between the dimensions and the coefficients of expansion of the various materials of this joint will be described with reference to FIG. 6 where the symbols used in the figure are defined as follows:

| | |
|---|---|
| $L_d$ | = the thickness of the inwardly extending flange; |
| $L_e$ | = the thickness of the end fitting plate which is sandwiched between the inwardly extending flange and the shoulder of the alignment pin; |
| $L_f$ | = the distance from the bottom of the inwardly extending flange to the shoulder of the alignment pin. |

The coefficients of thermal expansion of the materials are the same as with the previously described embodiment. A preferred relationship between these terms is expressed as follows.

$$L_d \alpha_1 + L_e \alpha_3 = L_f \alpha_2 \quad (3)$$

When designed substantially in accordance with the foregoing relationship, the assembled joint may be subjected to thermal cycling without incurring excessive stresses or deformation which would adversely affect the strength and replacement requirements, respectively, or the tightness of the joint components.

Two embodiments of a threaded connection which will provide easy disassembly of a fuel assembly to obtain access to the fuel rods have thus been described. These connections provide this much desired capability while also permitting the use of dissimilar materials in the assembly. As a result, the assembly may be designed using materials which display advantages from both the standpoint of neutron economy and dollar economy.

It should be understood that, while for purposes of explanation a fuel assembly has been shown and described having one embodiment of the joint at the upper end and another at the lower end, the same joint may be used at both ends or one of the disclosed joints may be used at one end with any other connection at the opposite end.

While these preferred embodiments of the invention have been shown and described, it will be understood that they are merely illustrative and that changes may be made without departing from the scope of the invention as claimed.

What is claimed is:

1. An improved nuclear fuel assembly of the type having a plurality of elongated fuel elements supported in a generally parallel array by fuel support structures which are rigidly attached to vertically extending hollow structural members at least one of which is in turn connected to upper and lower end fittings, said upper and lower end fittings include upper and lower end plates respectively, and means for alignment of the fuel within a reactor core comprising at least one vertically extending post, adapted to slidably engage corresponding openings in the reactor core structure, extending from the upper and lower end fitting plates, wherein the improvement comprises:
    a threaded spindle integral with and extending from said at least one vertically extending post to penetrate an aperture in said end fitting plate, said aperture being defined by a first bore section adjacent said vertically extending post having a diameter substantially the same as said spindle and a second bore section larger in diameter than said first bore, the transition between said first and second bores defining a first shoulder;
    a second shoulder on said vertically extending post to limit the penetration of said spindle; and
    mating threads on the interior of an end of said at least one hollow structural member to be threadably engaged with said spindle and into said second bore to bear against said first shoulder and secure said means for alignment, said end fitting plate, and said structural member to one another.

2. The nuclear fuel assembly of claim 1 including locking means to prevent relative rotation between said structural member and said vertically extending post after they are assembled to one another.

3. The nuclear fuel assembly of claim 2 wherein said locking means comprises an axial extension of said threaded spindle which is deformable into locking engagement with a recess in the interior of said structural member.

4. The nuclear fuel assembly of claim 1 wherein said structural member is made from a first material, and said end fitting plate and said vertically extending post are made from a second material, the coefficient of thermal expansion of said second material being greater than the coefficient of thermal expansion of said first material.

5. The nuclear fuel assembly of claim 4 wherein said first material is zircaloy and said second material is stainless steel.

6. The nuclear fuel assembly of claim 1 wherein said structural member is made from a first material having a coefficient of thermal expansion $\alpha_1$, said means for alignment is made from a second material having a coefficient of thermal expansion $\alpha_2$, and said end fitting plate is made from a third material having a coefficient of thermal expansion $\alpha_3$, and wherein said coefficients of thermal expansion are related according to the following: $\alpha_1 < \alpha_2 < \alpha_3$.

7. The nuclear fuel assembly of claim 6 wherein said first material is zircaloy, said second material is inconel and said third material is stainless steel.

8. The nuclear fuel assembly of claim 6 wherein said joint is designed substantially in accordance with the following relationship:

$$L_a \alpha_1 + L_b \alpha_3 = L_c \alpha_2$$

where
$L_a$ = the distance from the end of the threaded portion of said structural member to a point along the member such that substantially all of the load bearing threads are included therein;
$L_b$ = the portion of the thickness of said end fitting plate which contains said first bore section;
$L_c$ = the distance from said second shoulder on said vertically extending post to the point on said threaded spindle corresponding to said point on said structural member defined in the description of $L_a$.

* * * * *